United States Patent Office 3,304,150
Patented Feb. 14, 1967

3,304,150
METHOD OF TREATING EXHAUST GASES
OF INTERNAL COMBUSTION ENGINES
William A. Stover, Pitman, N.J., John L. Warthen, Baltimore, and Warren S. Briggs, Silver Spring, Md., assignors to W. R. Grace & Co., New York, N.Y., a corporation of Connecticut
No Drawing. Filed Sept. 5, 1963, Ser. No. 306,713
1 Claim. (Cl. 23—2)

This invention relates to an exhaust catalytic system for internal combustion engines. In one specific aspect it relates to a catalytic system having improved life and stability in the presence of volatile lead compounds contained in exhaust gases.

The problem of air pollution is not new. However, in recent years it has become one of great concern in many cities. The air in most cities contains substantial quantities of both oxides of nitrogen and products of incomplete combustion of organic fuel. In the presence of sunlight, photolysis of the oxides of nitrogen leads to the formation of measurable quantities of ozone. The ozone, in turn, reacts with various organic pollutants to form compounds which can cause the many undesirable manifestations of smog such as eye irritation, visibility reduction and plant damage. When meteorological conditions prevent the rapid dispersion of pollutants, a smog condition results. Furthermore, it is now known that in many cities a major portion of the organic pollutants is derived from unburned or partially burned gasoline in auto exhaust.

Carbon monoxide is another pollutant causing much concern because of its toxic nature. This, too, is derived mainly from auto exhaust.

Many attempts have been made to solve the problem of pollution from exhaust emissions. It has been realized that the most practical way to treat exhaust fumes to reduce hydrocarbon and carbon monoxide pollution is to oxidize the hydrocarbons to carbon dioxide and water and to oxidize the carbon monoxide to carbon dioxide.

A wide selection of oxidation catalyst has been produced in the past varying both in chemical composition and physical structure. With respect to chemical composition, the ability of a great variety of metals and metal oxides, either alone or in combination, to catalyze the complete oxidation of hydrocarbons has been noted.

To be adequately efficient in the removal of hydrocarbons and carbon monoxide from auto exhaust gases and to meet standards of maximum emission currently under consideration in the legislatures of a number of the states, the catalyst for treating exhaust gases must become efficient within a very few minutes after engine start-up and must maintain its activity throughout the various modes of engine operation. A catalytic converter must maintain its catalytic activity for a period of not less than one year and preferably two years or 20,000 miles of engine operation.

One of the major problems to be overcome in extending the life of the catalyst is the effect of lead contained in the exhaust gases on the catalyst. Lead compounds such as oxides of lead and particles of metallic lead, etc., result from the conversion of tetraethyl lead which is the most commonly used gasoline anti-knock additive. In the preparation of gasolines, a quantity of tetraethyl lead is added to the gasoline at the refinery to impart anti-knock properties to the fuel. In addition to the tetraethyl lead, various compounds such as ethylene bromide and ethylene chloride, for example, are added which convert the lead to volatile compounds which have an appreciable vapor pressure and are then carried out of the engine into the exhaust system. The presence of these compounds causes problems with catalytic systems in that these lead salts in addition to physically coating the individual catalyst particles cause deterioration and breakdown of the particles. One of the effects of the lead is to plug up the pores of the catalyst thus limiting the contact of the gases with the oxidation catalyst.

We have found a method whereby the life of oxidation catalysts is improved in the presence of volatile lead compounds in exhaust gases.

We have found that by including ferric oxide as an ingredient in auto exhaust conversion catalyst the lead resistance of the catalyst is greatly improved. A possible explanation for the improvement is that theoretically, $Fe_2O_3$ grows in crystallite size during the simultaneous oxidation and reduction reactions. The growth in crystallite size brings about a strain in the over-all catalyst and opens up the structure. This, therefore, minimizes the diffusion limitation brought about by plugging of the pores with lead compounds in the exhaust gases.

Broadly speaking, the method consists of coimpregnating a suitable support with an iron salt and other active oxidation components. Polyhydroxy alcohols and hydroxy acids can be used in the preparation if desired to increase the activity and further increase stability of the catalyst towards lead.

The first step of the process involves the selection of a suitable base. The base or support for the catalyst should have a high surface area and be a relatively porous material in order that maximum activity will be exhibited by the catalytic components. The support should have good strength properties to avoid the problem of excessive attrition. Examples of suitable supports include alumina silica-alumina, silica-magnesia, zirconia, zirconia-alumina, zirconia-magnesia, magnesia, etc. Particularly good results are obtained using a gamma-type alumina as the catalyst support. This support may be used in powdered, granulated, pilled or extruded form. A particularly desirable support is the gamma-type alumina which is commercially available in the form of nodules. These nodules have a very desirable combination of properties. Their crushing strength is quite high, they are porous, have a high surface area and are easily packed into the catalyst reactor.

The size of the nodules also has some bearing on the activity of the catalyst. The preferred size of these nodules is about 5 to 8 mesh (Tyler Standard Screen Scale). However, satisfactory results have been obtained when the nodules are in the range of 3 to 10 mesh (Tyler Standard Screen Scale).

After the support has been selected, it is impregnated with an iron salt—active oxidation component salt solution. Suitable active oxidation components include, for example, salts of cobalt, copper, manganese and palladium.

The oxidation component itself is not the vital part of our invention. Rather, it is the combination of the active oxidation component with $Fe_2O_3$. Therefore, for simplicity, the system $CuO-Pd-MnO_2$ will be used as the active oxidation component throughout the remaining description of our invention.

The impregnating solution is prepared by dissolving suitable copper, manganese and palladium salts in water in amounts sufficient to prepare a final catalyst containing 4 wt. percent $CuO$, 12 wt. percent $MnO_2$ and 0.02 wt. percent Pd. A sufficient amount of a soluble iron salt is dissolved to prepare a final catalyst containing about 2.5 to about 10 wt. percent $Fe_2O_3$. Suitable iron salts include, for example, the chloride, sulfate and nitrate. Because of its availablity and comparatively low cost, the nitrate is preferred.

The impregnating solution may also contain organic agents such as hydroxy acids, polyhydroxy acids, alcohols and polyalcohols. Examples of suitable compounds include sorbitol, citric acid, tartaric acid, glycolic acid, etc. The ratio of this agent added is about 1 to 5% of the weight of the catalyst base.

After the solution is prepared, it is used to impregnate the base. The impregnation need not be completed in only one step. Multiple impregnations can be carried out until the catalyst contains the desired amount of each component. If the multiple impregnation technique is employed, the catalyst should be dried between impregnations.

After the impregnation step is completed, the catalyst is dried at about 260° F. in air for about 10 to 20 hours.

Following drying the catalyst is calcined in air for about 1 to 20 hours at about 1000 to 1400° F., preferably 3 hours at about 1400° F.

The catalyst prepared according to our invention were evaluated using techniques to demonstrate their value as auto exhaust conversion catalysts. The catalysts were found to have good high temperature stability, good activity for hydrocarbon and carbon monoxide conversion and excellent lead resistance.

The attrition resistance of the catalyst particles was determined in a test which utilizes an air jet stream to transfer the individual granules against the wall of the containing vessel at relatively constant velocity and hence, with constant energy of impact. The impact causes slow degradation of the particles, the rate depending on the attrition properties of the particular catalyst. The specific method for determining attrition of the catalyst on the 5 to 8 mesh particles, for example, is as follows:

A sample of exactly 10 grams is placed in a one liter Erlenmeyer flask with a one inch diameter opening cut through the bottom, which opening is covered with a screen. An inverted brass funnel with a mouth size about the same size as the internal diameter of the neck of the flask is inserted in the mouth of the flask through a rubber stopper. A constant known air source of approximately 7.7 cubic feet per minute is directed into the funnel. With the Erlenmeyer flask in an inverted position and the sample resting on the screen over the funnel, the air jet causes the granules to be bombarded against the top and the sides of the flask. The superficial linear velocity of the air at the funnel stem is in excess of 400 feet per second. As the particles attrite, dust from the attrition is carried away by vacuum. A 10 gram sample of 5 to 8 mesh catalyst particles contains about 800 granules so that the sample is representative.

The air rate into the flask is kept constant by holding the pressure of the air supplied at 38 lb./in.$^2$. The attrition is carried on for a period of 30 minutes. After the test is completed, the sample is screened through a 12 mesh screen. The mesh of the screen is varied in determining the attrition of smaller and larger particles. The activity index of the catalyst for either carbon monoxide or hydrocarbon conversion is determined by measuring the area under an activity curve in the range of average catalyst temperature, 350–850° F., and then calculating what percentage of this area constitutes the area under the "ideal" activity curve. "Ideal" activity is defined as 100% conversion through this temperature range. Thus the activity index may vary from 0 which indicates no activity to 100 which would indicate so-called "ideal" activity.

The conversion as a function of average catalyst temperature is determined by passing a mixture of gases over the catalyst maintained at predetermined temperatures, at a gaseous hourly space velocity of 500 volumes of gas per volume of catalyst per hour. The mixture of gases used for this test contains 3.85% carbon monoxide, 1000 parts per million of normal hexane, 10% water, 4.5% oxygen, and the balance nitrogen.

Our invention will be further explained by the following specific but non-limiting examples.

*Example I*

In this run, an oxidation catalyst containing 4.0% $Fe_2O_3$ was prepared.

An impregnating solution was prepared by dissolving 60.6 grams $Fe(NO_3)_3.9H_2O$ and 46.6 grams $$Co(NO_3)_2.6H_2O$$

in 148.3 grams of a 50% aqueous solution of $Mn(NO_3)_2$. An additional 50 cc. of water along with 0.6 cc. of a 10% solution of $Pd(NO_3)_2$ were then added to the mixture.

The solution was used to impregnate 240 grams (dry basis) of alpha alumina monohydrate nodules. Seven impregnations were carried out with the catalyst being dried between each one for 4 hours at 260° F. After the final impregnation, the catalyst was dried 16 hours at 260° F. It was then calcined for 3 hours at 1400° F.

The final catalyst contained 4% CoO, 0.02% Pd, 12% $MnO_2$ and 4% $Fe_2O_3$.

*Example II*

In this run a $MnO_2$–Pd–$Fe_2O_3$ catalyst was prepared.

The impregnating solution was prepared by dissolving 121.2 grams of $Fe(NO_3)_2.9H_2O$ in 148.3 grams of a 50% aqueous $Mn(NO_3)_2$ solution. 60 cc. of water and 0.6 cc. of a 10% $Pd(NO_3)_2$ solution were then added.

The solution was used to impregnate 240 grams (dry basis) of alpha alumina monohydrate nodules. The nodules were then dried for 16 hours at 260° F. and finally calcined for 3 hours at 1400° F.

The catalyst contained 12% $MnO_2$, 0.02% Pd and 8.0% $Fe_2O_3$.

*Example III*

The catalyst in this run was prepared to contain 4% CuO, 12% $MnO_2$, 0.02% Pd and 4% $Fe_2O_3$.

The impregnating solution was prepared by dissolving 60.6 grams of $Fe(NO_3)_3.9H_2O$ and 36.4 grams of $$Cu(NO_3)_2.3H_2O$$

in 148.3 grams of a 50% aqueous solution of $Mn(NO_3)_2$. 50 cc. of $H_2O$ and 0.6 cc. of 10% $Pd(NO_3)_2$ solution were added to the mixture.

A total of 240 grams (dry basis) of alpha alumina monohydrate was treated with the mixture using 6 impregnations. The catalyst was dried for 4 hours at 260° F. between each impregnation. The final catalyst was dried for 16 hours at 260° F. and finally calcined for 3 hours at 1400° F.

*Example IV*

The catalyst in this run was prepared to contain $MnO_2$, CuO, CoO, Pd and $Fe_2O_3$.

The impregnating solution was prepared by dissolving 24.2 grams of $Cu(NO_3)_2.3H_2O$, 31.1 grams of $$Co(NO_3)_2.6H_2O$$

and 40.4 grams of $Fe(NO_3)_3.9H_2O$ in 148.3 grams of a 50% aqueous solution of $Mn(NO_3)_2$. 60 cc. of $H_2O$ and 0.6 cc. of a 10% $Pd(NO_3)_2$ solution were added to the mixture.

The mixture was used to impregnate 261 grams (240 grams, dry basis) of alpha alumina monohydrate nodules. The catalyst was then dried for 16 hours at 260° F. and calcined for 3 hours at 1400° F.

The final catalyst contained 12% $MnO_2$, 2.67% CuO, 2.67% CoO, 0.02% Pd and 2.6% $Fe_2O_3$.

*Example V*

The catalysts prepared in the preceding examples were tested for attrition, activity and conversion as a function of temperature by the tests described previously.

High temperature stability was tested by calcining the catalysts for an additional 16 hours at 1400° F. (making a total calcination time of 19 hours) and repeating the tests performed on the catalysts which had been calcined for only 3 hours.

Results of the tests are set out in the table below:

TABLE I

|  | Catalyst of— | | | | | | | |
|---|---|---|---|---|---|---|---|---|
|  | Example I, Calcined for— | | Example II, Calcined for— | | Example III, Calcined for— | | Example IV, Calcined for— | |
|  | 3 hrs. | 19 hrs. | 3 hrs. | 19 hrs. | 3 hrs. | 19 hrs. | 3 hrs. | 19 hrs. |
| Percent Attrition | 23 | 14 | 43 | 35 | 32 | 15 | 22 | 12 |
| Conversions as a function of average catalyst temperature: | | | | | | | | |
| Percent CO at 450° F | 92 | 91 | 86 | 91 | 90 | 88 | 81 | 66 |
| Percent Hydrocarbons at 750° F | 99 | 98 | 99 | 99 | 99 | 98 | 97 | 95 |
| Activity Index: | | | | | | | | |
| CO | 93.7 | 93.4 | 91.5 | 92.3 | 92.9 | 92.5 | 89.3 | 85.7 |
| Hydrocarbons | 60.0 | 58.9 | 62.1 | 60.0 | 55.9 | 54.6 | 56.7 | 47.0 |

*Example VI*

The improvement which the inclusion of $Fe_2O_3$ has caused in the catalysts can be seen in the data set out in the following table. Catalyst A contains 12% $MnO_2$, 8% CuO and 0.02% Pd. Catalyst B contains 12% $MnO_2$, 4% CuO, 0.02% Pd and 4% $Fe_2O_3$. Catalyst C contains 12% $MnO_2$, 8% CoO, and 0.02% Pd. Catalyst D contains 12% $MnO_2$, 4% CoO, 0.02% Pd and 4% $Fe_2O_3$.

TABLE II

|  | Catalyst A | Catalyst B | Catalyst C | Catalyst D |
|---|---|---|---|---|
| Percent $Fe_2O_3$ | 0 | 4 | 0 | 4 |

|  | Calcined | | Calcined | | Calcined | | Calcined | |
|---|---|---|---|---|---|---|---|---|
|  | 3 hrs. | 19 hrs. | 3 hrs. | 19 hrs. | 3 hrs. | 19 hrs. | 3 hrs. | 19 hrs. |
| Activity Index: | | | | | | | | |
| CO | 93.2 | 83.2 | 92.9 | 92.5 | 91.6 | 81.9 | 93.7 | 93.4 |
| Hydrocarbons | 53.7 | 43.4 | 55.9 | 54.6 | 59.8 | 53.7 | 60.0 | 58.9 |

It is obvious from the data that the catalysts containing iron are more stable toward high temperatures. This improvement is shown by a comparison of the data collected on Catalyst A with Catalyst B and Catalyst C with Catalyst D. These compositions are the same with the exception that Catalyst A contains more copper and Catalyst C more cobalt than Catalysts B and D respectively. The activity index for carbon monoxide conversion dropped approximately 10 points after calcination for 16 hours beyond the initial 3 hour calcination in the catalysts which contained no iron. The activity remained essentially the same where iron was present even though these catalysts contained a smaller percentage of copper and cobalt. The activity indices for hydrocarbons show the same loss in thermal stability in the absence of iron.

What is claimed is:

A method for treating exhaust gases of internal combustion engines to oxidize the air pollutants therein which comprises mixing an oxygen containing gas with said exhaust gases and passing said mixture through a bed of a catalyst comprising 0 to 4 weight percent CoO, 0 to 4 weight percent CuO, about 12 weight percent $MnO_2$, about 0.02 weight percent Pd and 2 to 10 weight percent $Fe_2O_3$ on a nodular gamma alumina support and passing the thus treated gases to the atmosphere.

References Cited by the Examiner

UNITED STATES PATENTS

| 2,606,159 | 8/1952 | Owen | 252—466 X |
| 3,065,595 | 11/1962 | Gary | 23—2 X |
| 3,179,488 | 4/1965 | Appell | 23—2 |

OSCAR R. VERTIZ, *Primary Examiner.*

EARL C. THOMAS, *Examiner.*